(12) United States Patent
Stephens et al.

(10) Patent No.: US 12,290,729 B2
(45) Date of Patent: *May 6, 2025

(54) EXTENDED REALITY SYSTEM FOR TRAINING AND EVALUATION

(71) Applicant: XReps, LLC, Olathe, KS (US)

(72) Inventors: Joel Stephens, Plattsburg, MO (US); Rohit Chaube, Kansas City, MO (US); Brandon Fuhr, Lenexa, KS (US); Greg Elliott, Olathe, KS (US)

(73) Assignee: XReps, LLC, Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,456

(22) Filed: Jan. 5, 2024

(65) Prior Publication Data

US 2024/0139599 A1  May 2, 2024

Related U.S. Application Data

(63) Continuation of application No. 17/519,110, filed on Nov. 4, 2021, now Pat. No. 11,896,882.

(60) Provisional application No. 63/109,692, filed on Nov. 4, 2020.

(51) Int. Cl.
*A63B 69/00* (2006.01)
*G02B 27/00* (2006.01)
*G02B 27/01* (2006.01)
*G09B 9/00* (2006.01)

(52) U.S. Cl.
CPC ........ *A63B 69/002* (2013.01); *G02B 27/0093* (2013.01); *G02B 27/017* (2013.01); *G09B 9/00* (2013.01)

(58) Field of Classification Search
CPC ........ G09B 9/006; G09B 19/003; G09B 9/00; A63B 69/002; G02B 27/009; G02B 27/017
See application file for complete search history.

(56) References Cited

U.S. PATENT DOCUMENTS

2017/0274275 A1* 9/2017 Vandonkelaar ........ G06V 20/52

* cited by examiner

*Primary Examiner* — Thomas H Henry
(74) *Attorney, Agent, or Firm* — AVEK IP, LLC

(57) ABSTRACT

A tracking system includes a host station and a sensor station. The sensor station includes transmitters transmitting an IR synchronous signal and IR laser signal. The system includes a head-mounted display and a tracked object, which has a plurality of object sensors. The tracked object determines its location and orientation relative to the sensor station based on the IR signals. The tracked object transmits the location and orientation to the host station. The host station determines an actual flight path of the tracked object during an object tracking event; generates a predicted flight path of the tracked object; and renders an image of a virtual object on a display of the head-mounted display. The image includes a virtual object corresponding to the tracked object, wherein the image is rendered in a VR environment such that the virtual object moves along the actual flight path and the predicted flight path.

20 Claims, 14 Drawing Sheets

EXTENDED REALITY SYSTEM FOR TRAINING AND EVALUATION

CROSS-REFERENCE TO RELATED APPLICATIONS

This application claims priority to and the benefit of U.S. patent application Ser. No. 17/519,110, filed Nov. 4, 2021, entitled EXTENDED REALITY SYSTEM FOR TRAINING AND EVALUATION, which claims priority to and the benefit of U.S. Provisional Patent Application Ser. No. 63/109,692 filed Nov. 4, 2020, and entitled "EXTENDED REALITY (XR) TRAINING & EVALUATION PLATFORM," each of which is hereby incorporated by reference in its entirety.

FIELD OF THE DISCLOSURE

The field of the disclosure relates generally to virtual reality (VR) and/or augmented reality (AR) systems for use in training and evaluation, and, more particularly, to VR/AR systems that integrate real world object positional tracking into a virtual world or environment for use in athletic training and evaluation.

BACKGROUND OF THE DISCLOSURE

In real world athletic training, an athlete in training typically uses real sports equipment and generally requires large open spaces (e.g., a football field, baseball, field, etc.) to practice their selected sport. Accessibility to such equipment and open spaces may be limited and/or unavailable, for example, due to location, time, weather, etc. As such, an athlete's training may be limited and/or hindered simply due to availability of equipment and/or practice facilities.

In some sports, training simulators have been developed for training athletes. However, these simulators are not effective in replicating real-life sporting conditions, in part because they may not allow the athlete to interact with the equipment, such as a ball, bat, target, etc., in a realistic manner.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes a tracking system having a host station and a sensor station. The sensor station includes a first transmitter transmitting an infrared (IR) synchronous signal, and a second transmitter transmitting an IR laser signal. The IR synchronous signal and the IR laser signal are broadcast across a user-definable area. The system also includes a head-mounted display including a display displaying a virtual reality (VR) environment. Furthermore, the system includes a tracked object including a plurality of object sensors sensing the IR synchronous signal and the IR laser signal. The tracked object determines an object location and an object orientation of the tracked object relative to the sensor station based on the IR synchronous signal and the IR laser signal. The tracked object transmits the object location and the object orientation to the host station. The host station includes a processor coupled in communication to the tracked object and the head-mounted display. The processor is programmed to determine an actual flight path of the tracked object during an object tracking event where the tracked object is moving relative to the sensor station. The actual flight path is based on the object location and the object orientation of the tracked object. The processor is also programmed to generate a predicted flight path of the tracked object based on the object location and the object orientation of the tracked object. Furthermore, the processor is programmed to render an image of a virtual object on the display of the head-mounted display in the VR environment. The image includes an image of a virtual object corresponding to the tracked object. The image of the virtual object is rendered in the VR environment such that the image of the virtual object moves along the actual flight path rendered in the VR environment on the display and the predicted flight path rendered in the VR environment on the display.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Figure 1:
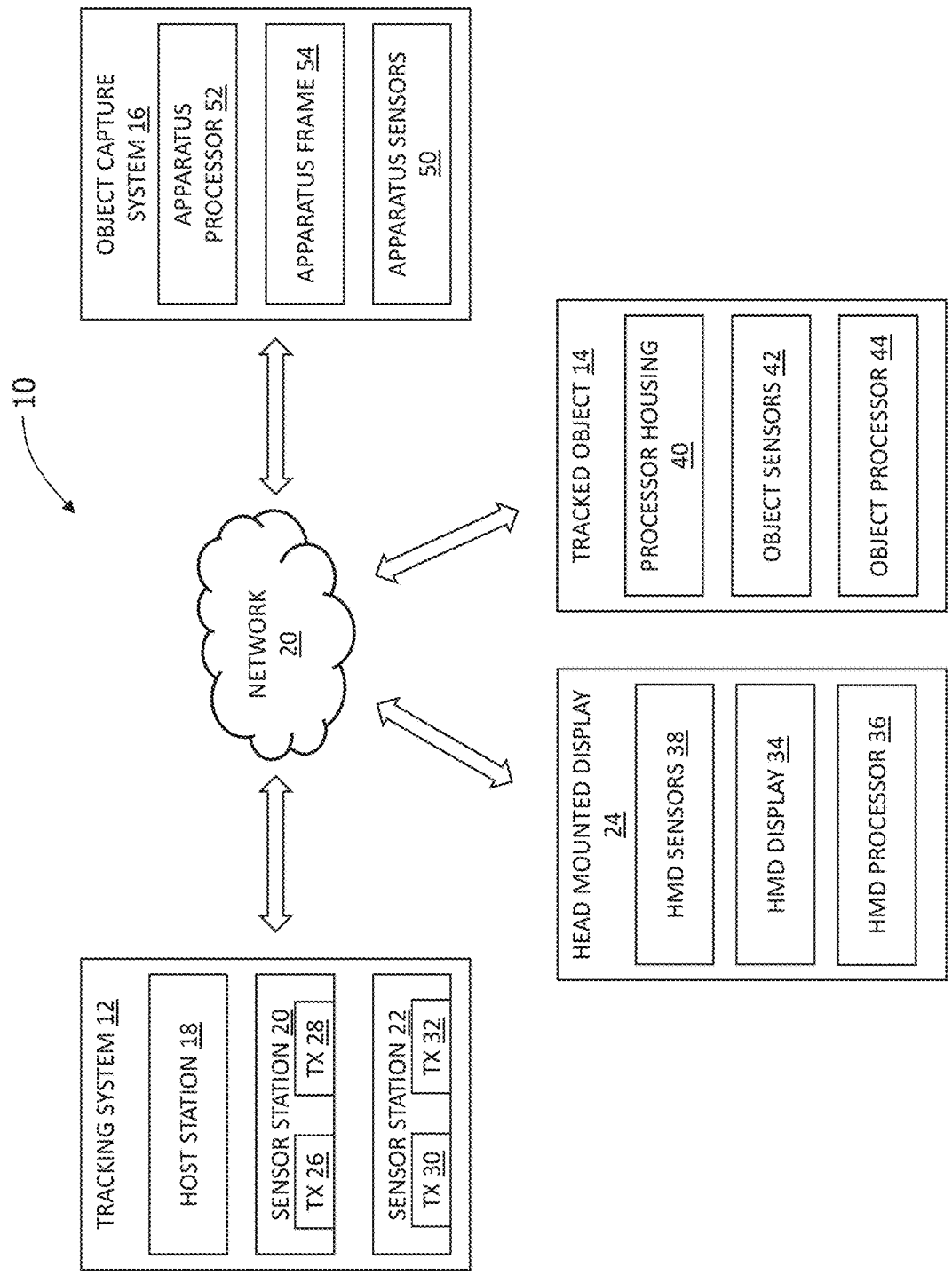
FIG. 1 is a block diagram of an extended reality system for training and evaluation, in accordance with one embodiment of the present disclosure.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein. TRAINING SYSTEM FIG. 1 is a block diagram of an extended reality system 10 for training and evaluation, in accordance with one embodiment of the present disclosure. As used herein, the term extended reality (XR) is an umbrella term used to refer to virtual reality (VR), augmented reality (AR), mixed reality (MR), and other simulated reality technologies. In the exemplary embodiment, the XR system 10 is configured to sense physical activity associated with a peripheral device (i.e., a tracked object) and to simulate an outcome produced by the sensed physical activity.

In embodiments of the present disclosure, the XR system 10 includes a tracking system 12, a tracked object 14, an object capture system 16, and a head-mounted display (HMD) 24. The XR system 10 permits a user (not shown in FIG. 1) wearing the HMD 24 to interact with the tracked object 14, which object interaction is tracked by the object tracking system 12. For example, in a preferred embodiment, the tracked object 14 is an American football and the object capture system 16 is a net. In an exemplary embodiment, the user throws the football into the net and an actual flight path of the football is tracked by the tracking system 12. The XR system 10 predicts a flight path of the football that would have been produced without interference by the net. It will be appreciated that the tracked object 14 may embody other types of athletic balls or athletic devices (e.g., balls, bats, rackets, goals, etc. associated with other sports, such as soccer, baseball, hockey, basketball, rugby, cricket, handball, etc.). In use, the tracked object 14 is configured to be grasped and thrown by a user into the net (i.e., the object capture system 16) as part of a simulated activity.

In the exemplary embodiment, the tracking system 12 includes a host station 18 and one or more sensor stations 20 and 22. The host station 18 includes a conventional computer or a cloud-based equivalent (e.g., cloud-based server), and is described in more detail below with respect to FIG. 7. In certain embodiments, the host station 18 may be configured to communicate with the sensor stations 20 and 22 to transmit and/or receive data therebetween. The host station 18 may communicate with the sensor stations 20 and 22 via wired or wireless communication. For example, communication between the components may be established via one or more of a local area network (LAN) or a wide area network (WAN) in typical wired communications. Further, for wireless communications, for example, communication may be established via one or more of Wi-Fi (e.g., implementing the Institute of Electrical and Electronics/IEEE 802.11 family of standards), radio frequency (RF) communication, Bluetooth communication, and/or with a mobile phone network, such as Global System for Mobile communications (GSM), broadband cellular networks (e.g., 3G, 4G, 5G, etc.), or other mobile data networks, and/or Worldwide Interoperability for Microwave Access (WiMax) and the like.

In the example embodiment, each of the sensor stations 20 and 22 includes a pair of transmitters (TXs). For example, the sensor station 20 includes first and second transmitters, TX 26 and TX 28. The sensor station 22 includes first and second transmitters, TX 30 and TX 32. In a preferred embodiment, each of the first TXs 26 and 30 include an infrared (IR) emitter or light emitting diode (LED). Each of the second TXs 28 and 32 include an IR laser emitter system capable of emitting separate IR laser signals that are orthogonal to each other, for example, in an elevation and azimuth direction relative to the sensor station.

The sensor station 20 transmits a synchronous signal (i.e., a pulse or IR light) by the TX 26 and transmits a laser signal (i.e., sweeps a beam) by the TX 28 across a physical space, for example in the azimuthal direction relative to the sensor station 20. The sensor station 20 then transmits another synchronous signal by the TX 26 and transmits another laser signal by the TX 28 across the physical space, for example, in the elevation direction relative to the sensor station 20. This may be referred to as a complete sweep cycle T1 of the sensor station 20. Likewise, the sensor station 22 transmits a synchronous signal by the TX 30 and transmits a laser signal by the TX 32 across the physical space, for example in the azimuthal direction relative to the sensor station 22. The sensor station 22 then transmits another synchronous signal by the TX 30 and transmits another laser signal by the TX 32 across the physical space, for example, in the elevation direction relative to the sensor station 22. This may be referred to as a complete sweep cycle T2 of the sensor station 22. It is noted that the synchronous signal of one of the sensor stations may be used by the other sensor station to synchronize the sensor stations 20 and 22. Further, in a preferred embodiment, the synchronous signals and/or the laser signals may be modulated or coded to distinguish which sensor station transmitted which signal.

The sensor stations 20 and 22 may be variously located relative to the HMD 24. The sensor stations 20 and 22 may be provided in separative housing or enclosures, and may be supported on various structures, such as a wall, ceiling, truss, or any other building element, or on a free standing structure, such as the capture system 16.

The depicted HMD 24 includes a conventional VR headset, which may be worn by a user. The HMD 24 includes at least an HMD display 34, and HMD processor 36, and a plurality of HMD sensors 38. The HMD sensors 38 are used for tracking a location and orientation of the HMD 24 via the sensor stations 20 and 22. In a preferred embodiment, the HMD sensors 38 include optical receivers and sensors for sensing IR radiation, such as the synchronous signals and laser signals transmitted by the TXs 26, 28, 30, and 32. However, the HMD 24 may additionally, or alternatively, use light detection and ranging (LIDAR), ultrasonic ranging, stereoscopic ranging, structured light analysis, dot projection, particle projection, time-of-flight observations, and so forth for use in determining or tracking its location and orientation within predefine area.

In the example embodiment, the tracked object 14 includes a processor housing 40, a plurality of object sensors 42, and an object processor 44. The plurality of object sensors 42 are used for tracking a location and orientation of the tracked object 14 via the sensor stations 20 and 22. In a preferred embodiment, the object sensors 42 include optical receivers and sensors for sensing IR radiation, such as the synchronous signals and laser signals transmitted by the TXs 26, 28, 30, and 32. However, the tracked object 14 may additionally, or alternatively, use light detection and ranging (LIDAR), ultrasonic ranging, stereoscopic ranging, structured light analysis, dot projection, particle projection, time-of-flight observations, and so forth for use in determining or tracking its location and orientation within predefine area.

In the example embodiment, the object capture system 16 includes an apparatus processor 52, an apparatus structure or frame 54, and a plurality of apparatus sensors 50. The plurality of apparatus sensors 50 are used for tracking a location and orientation of the object capture system 16 via the sensor stations 20 and 22. In a preferred embodiment, the apparatus sensors 50 include optical receivers and sensors for sensing IR radiation, such as the synchronous signals and laser signals transmitted by the TXs 26, 28, 30, and 32. However, the object capture system 16 may additionally, or alternatively, use light detection and ranging (LIDAR), ultrasonic ranging, stereoscopic ranging, structured light analysis, dot projection, particle projection, time-of-flight observations, and so forth for use in determining or tracking its location and orientation within predefine area.

Figure 2:
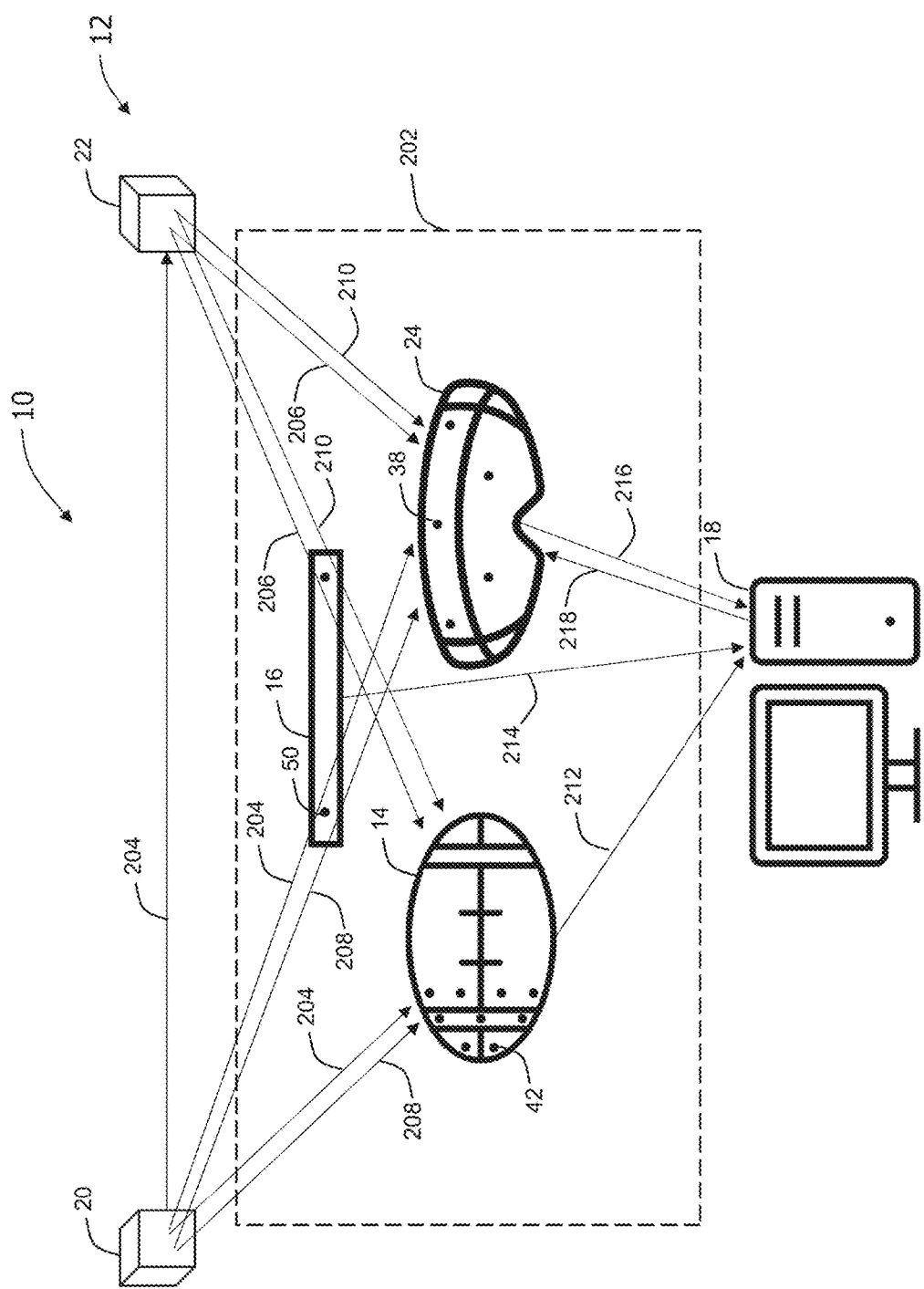
FIG. 2 is a schematic diagram of the XR system shown in FIG. 1, showing signal and data flow among the devices during an object tracking event.

FIG. 2 is a schematic diagram of the XR system 10 shown in FIG. 1, showing signal and data flow among the devices during an object tracking event. In the example embodiment, the sensor station 20 transmits a synchronous signal 204, for example, via the TX 26 (shown in FIG. 1). The synchronous signal 204 includes an IR radiation flash that floods a user-definable area 202. In the depicted example, the synchronous signal 204 is used by the sensor station 22 to synchronize the two sensor stations 20 and 22. It is contemplated, however, that a synchronous signal transmitted by the sensor station 22 can be used by the sensor station 20 to synchronize the two sensor stations 20 and 22.

Similarly, the sensor station 22 transmits a synchronous signal 206, for example, via the TX 30 (shown in FIG. 1). The synchronous signal 206 includes an IR radiation flash that floods a user-definable area 202. The tracked object 14, the object capture system 16, and the HMD 24 are positioned within the user-definable area 202. Consequently, the apparatus sensors 50, the object sensors 42, and the HMD sensors 38 receive or sense the synchronous signals 204 and 206.

The sensor station 20 then transmits a laser signal 208, for example, via the TX 28 (shown in FIG. 1). The laser signal 208 includes an IR laser sweep across the user-definable area 202. Likewise, the sensor station 22 transmits a laser signal 210, for example, via the TX 32 (shown in FIG. 1). The laser signal 210 includes an IR laser sweep across the user-definable area 202. The tracked object 14, the object capture system 16, and the HMD 24, and more particularly, the apparatus sensors 50, the object sensors 42, and the HMD sensors 38, respectively, receive or sense the laser signals 208 and 210. The apparatus processor 52, the object processor 44, and the HMD processor 36 determines or calculates the location and orientation (also referred to as the pose) of the object capture system 16, the tracked object 14, and the HMD 24, respectively, based on calculating a timing difference between the arrival of the synchronous signals 204 and 206 and the laser signals 208 and 210, respectively, using, for example, a triangulation algorithm based on design parameters and location data of the objects.

The tracked object 14 transmits its location and orientation information (e.g., location and orientation data) to the host station 18 via a wireless communication data stream 212. Similarly, object capture system 16 transmits its location and orientation information (e.g., location and orientation data) to the host station 18 via a wireless communication data stream 214. Likewise, the HMD 24 transmits its location and orientation information (e.g., location and orientation data) to the host station 18 via a wireless communication data stream 216.

The user-definable area 202 is sized and shaped to be covered by the sensor stations 20 and 22. That is, the TXs 26, 28, 30, and 32 are able to transmit their respective signals across an entire user-definable area. In a preferred embodiment, the user-definable area 202 is a volume about ten meters (10 m) by about ten meters (10 m) by about ten meters (10 m). Such a space is sufficiently large to provide a user of the XR system 10 sufficient flexibility and mobility, yet sufficiently small enough to enable the synchronous signals 204 and 206 and the laser signals 208 and 210 to be sensed at any defined point in the user-defined area 202.

As described above, referring to FIGS. 1 and 2, the tracking system 12 is operable to facilitate tracking a location and orientation (or pose) of the tracked object 14, object capture system 16, and the HMD 24 during use. The tracking system 12 is further configured to predict a flight path of the tracked object 14 (e.g., a football) when the object is thrown by a user during an object tracking event (e.g., a football throwing event). In particular, the tracking system 12, for example, via the host station 18, is configured to sense or track a flight path associated with the ball throwing event and simulate or display the actual tracked flight path in a virtual reality (VR) environment, via data signal 218, as viewed by the user on the HMD display 34, or other display (not shown). Substantially simultaneously, the tracking system 12, via the host station 18, is further configured to simulate aspects of the predicted flight path in real time for the user as part of the VR environment.

Tracked Object

Figure 3:
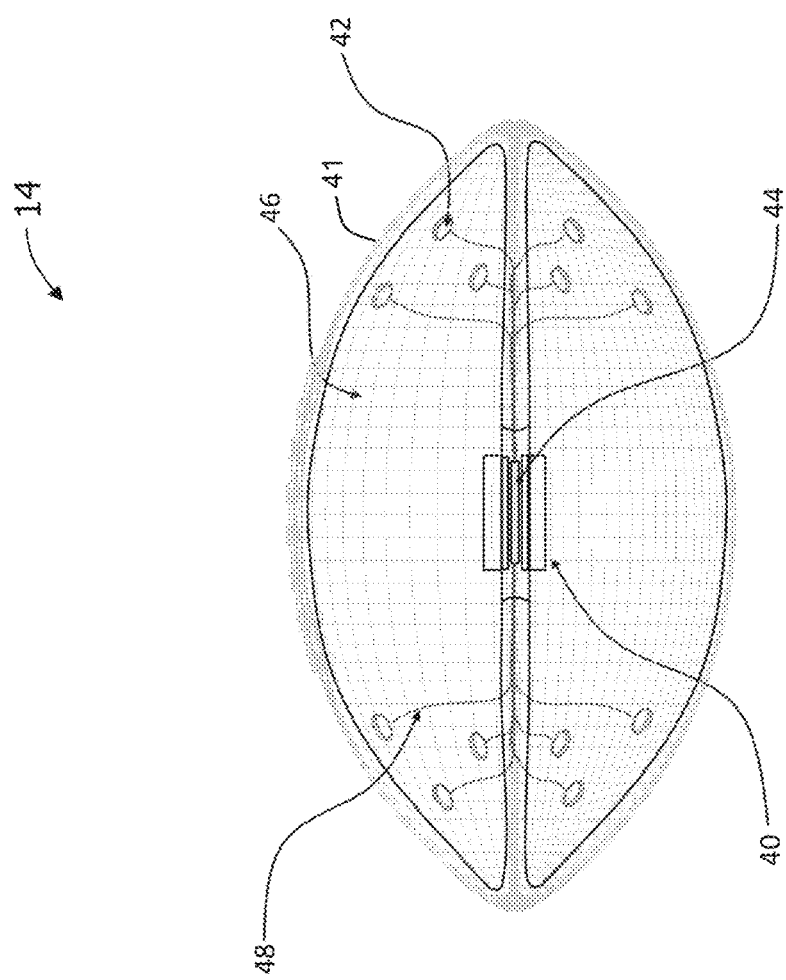
FIG. 3 is an example configuration of a tracked object shown in FIG. 1, in accordance with one aspect of the present invention.

FIG. 3 is an example configuration of the tracked object 14, in accordance with one aspect of the present invention. As described above, in the exemplary embodiment, the tracked object 14 is preferably in the form of an American football. In the depicted embodiment, the football 14 includes an outermost covering 41 and an inflatable bladder 46 contained by the covering 41. As described with respect to FIG. 1, the football 14 also includes processor housing 40, the plurality of object sensors 42, and the object processor 44. In an example embodiment, the object sensors 42 are mounted along a periphery of the bladder 46 in a predetermined pattern or location. For example, as depicted in FIG. 3, a plurality of object sensors 42 are located at each end of the football 14. Each sensor 42 may be encased in a protective housing (not shown). The covering 41 includes a plurality of apertures, each associated with a respective object sensor 42, to enable the object sensors 42 to receive one or more of the synchronous signals 204 and 206 and the laser signals 208 and 210, as described herein.

In the example embodiment, the football 14 processor housing 40 is substantially centered within the bladder 46 and includes the object processor 44 enclosed therein. In this manner, the processor 44 is supported by the bladder 46 and protected from exterior forces during use of the football 14. Each of the object sensors 42 are coupled in communication to the object processor 44 via one or more electrical connections 48 (e.g., electrical signal wires).

Although the depicted relative arrangement of the processor 44, bladder 46, and sensors 42 is preferred, such components may be alternatively supported as part of the football 14. For instance, the football 14 may include one or more discrete containers within the football 14 to house the processor 44 and/or sensors 42. Additional embodiments of the football 14 are described in more detail below.

Figure 4:
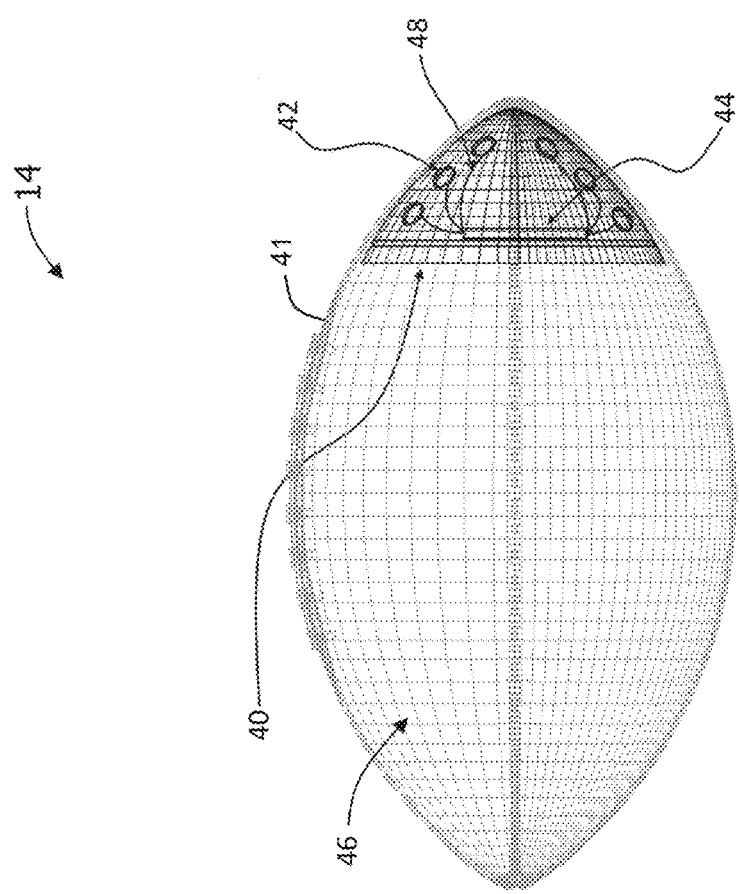
FIG. 4 is an alternative configuration of the tracked object.

FIG. 4 is an alternative configuration of the tracked object 14. In the depicted embodiment, the object sensors 42, electrical connections 48, and the object processor 44 are all contained in the processor housing 40. The processor housing 40 is embedded within the outermost covering 41 at one end of the football 14. The bladder 46 fills the remainder of the space within the covering 41.

Figure 5:
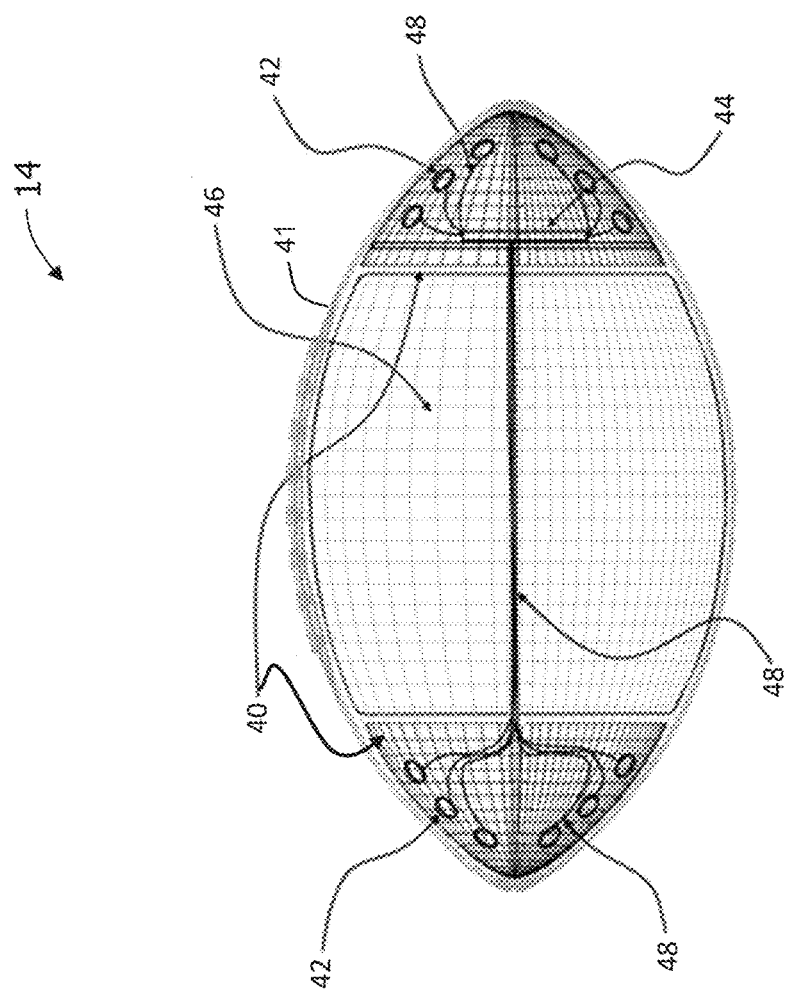
FIG. 5 is another alternative configuration of the tracked object.

FIG. 5 is another alternative configuration of the tracked object 14. In the depicted embodiment, on a first end of the football 14, the object sensors 42, electrical connections 48, and the object processor 44 are all contained in a processor housing 40. The second end of the football 14 includes another processor housing 40. However, on the second end, only object sensors 42 and electrical connections 48 are contained therein. The electrical connections 48 extend along the interior of the football 14 and are coupled to the object processor 44 in electrical communication.

Figure 6:
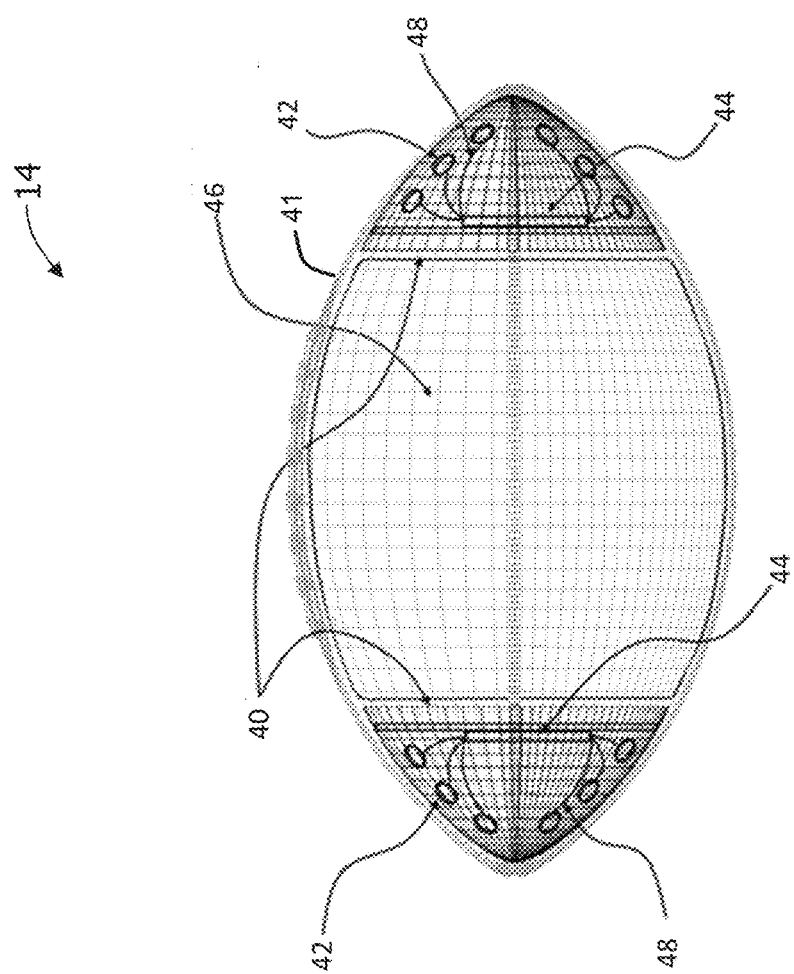
FIG. 6 is yet another alternative configuration of the tracked object.

FIG. 6 is yet another alternative configuration of the tracked object 14. The depicted embodiment in similar to the embodiment shown in FIG. 4 in that at a first end of the football 14, a plurality object sensors 42, electrical connections 48, and a first object processor 44 are all contained in the processor housing 40. A second end of the football 14 includes a substantially similar arrangement as the first end. In particular, a plurality object sensors 42, electrical connections 48, and a second object processor 44 are all contained in a second processor housing 40. The processor housings 40 are embedded within the outermost covering 41 at opposite ends of the football 14. The bladder 46 fills the remainder of the space within the covering 41.

It is appreciated that while FIGS. 3-6 depict various example embodiments of a tracked football 14, there are other arrangements of housings 40, sensors 42, and processor(s) 44 contemplated, according to other aspects of the present invention. In addition, as noted herein, the tracked object 14 may embody other types of athletic balls or athletic devices/equipment (e.g., balls, bats, rackets, goals, etc. associated with other sports, such as soccer, baseball, hockey, basketball, rugby, cricket, handball, etc.).

Object Capture System

Figure 7:
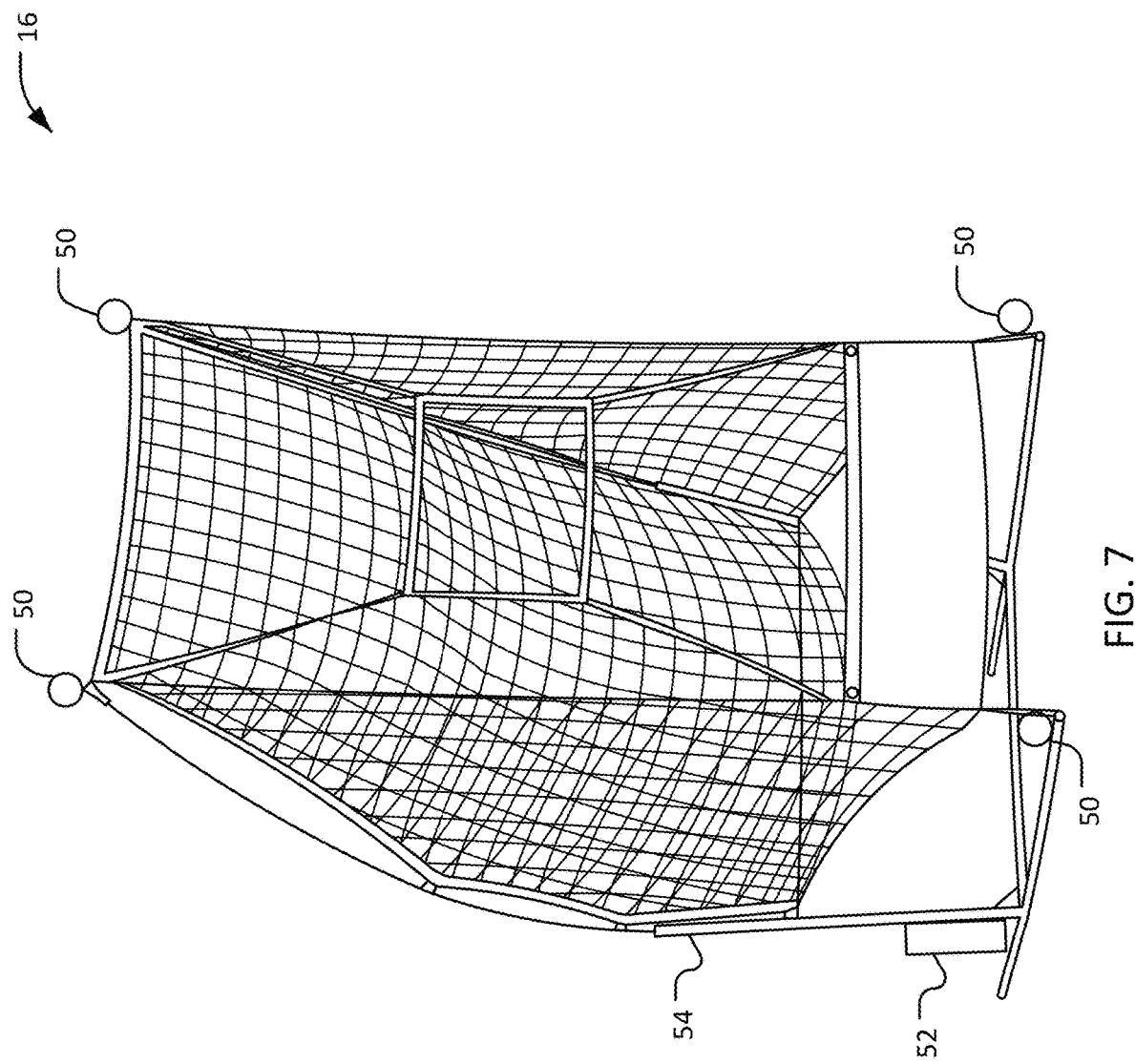
FIG. 7 is an example configuration of an object capture system shown in FIG. 1, in accordance with one aspect of the present invention.

FIG. 7 is an example configuration of the object capture system 16, in accordance with one aspect of the present invention. As described above, in the exemplary embodiment, the object capture system 16 is preferably in the form of a net, and more particularly a football throwing/kicking net. In the depicted embodiment, the net 16 includes an apparatus frame 50 with a net attached thereto. As described with respect to FIG. 1, the net 16 also includes the apparatus processor 52 and the plurality of apparatus sensors 50. The apparatus sensors 50 are coupled to the apparatus frame 54. In addition, each apparatus sensor 50 is coupled in communication to the apparatus processor 52, for example, via one or more electrical wires (not shown). In an example embodiment, the apparatus sensors 50 are mounted to the corners of the apparatus frame 54, thereby facilitating tracking or locating the extent of the object capture system 16 using the tracking system 12.

In use, the tracked net 16 allows for easy setup and calibration of the XR system 10. When using the net 16, after the thrown football 14 passes a pre-defined threshold relative to the net 16, a virtual football will be displayed to the user in the HMD 24 and will travel into a virtual football field towards a virtual target along a predicted flight path. As described herein, the predicted flight path is based, in part, on a tracked flight path of the football 14.

Host Station

Figure 8:
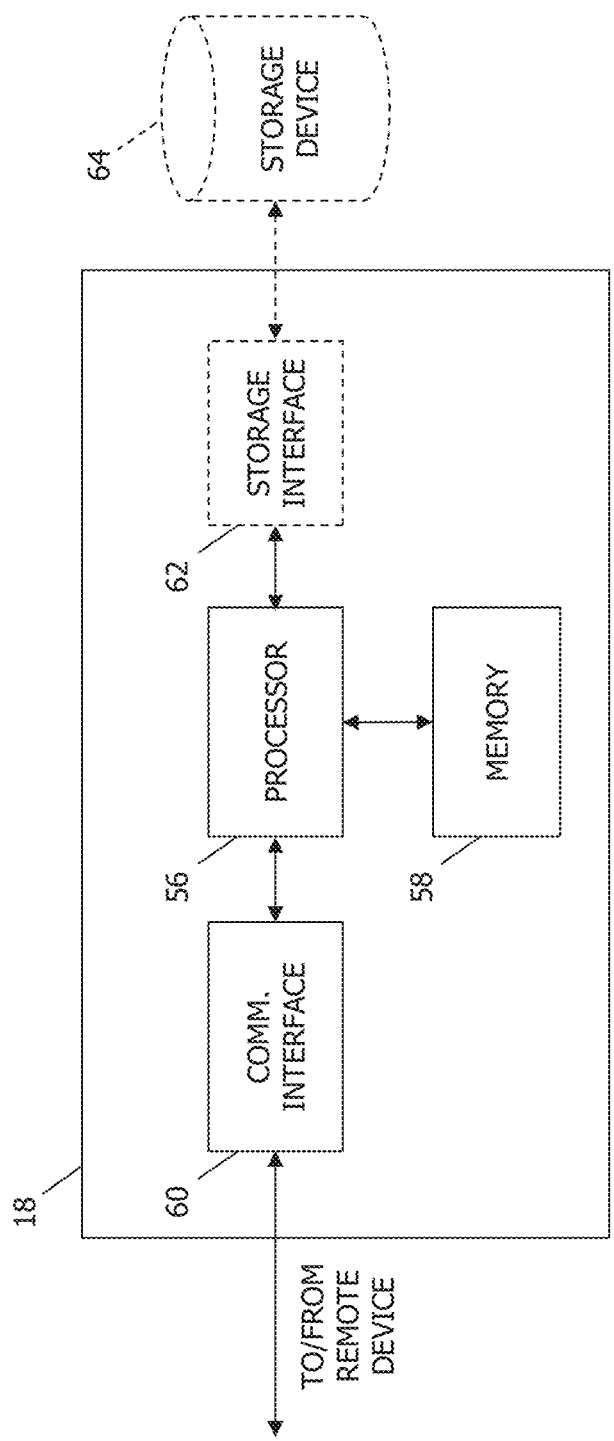
FIG. 8 is an example configuration of a host station shown in FIG. 1, in accordance with one aspect of the present invention.

FIG. 8 is an example configuration of the host station 18. In the example embodiment, the host station 18 includes a processor 56 for executing instructions. The instructions may be stored in a memory area 58, for example. The processor 56 includes one or more processing units (e.g., in a multi-core configuration) for executing the instructions. The instructions may be executed within a variety of different operating systems on the host station 18, such as UNIX, LINUX, Microsoft Windows®, etc. More specifically, the instructions may cause various data manipulations on data stored in a storage device 64. It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.).

The processor 56 is operatively coupled to a communication interface 60 such that the host station 18 can communicate with a remote device such as the tracked object 14, the object capture system 16, and the HMD 24. For example, the communication interface 60 may receive wireless or wired communications from the tracked object 14, the object capture system 16, and the HMD 24.

The processor 56 is operatively coupled to the storage device 64. The storage device 64 is any computer-operated hardware suitable for storing and/or retrieving data. In some embodiments, the storage device 64 is integrated in the host station 18. In other embodiments, the storage device 64 is external to the host station 18, such as the third party data repository or database. For example, the host station 18 may include one or more hard disk drives as the storage device 64. In other embodiments, the storage device 64 is external to the host station 18 and may be accessed by a plurality of host stations 18. For example, the storage device 64 may include multiple storage units such as hard disks or solid-state disks in a redundant array of inexpensive disks (RAID) configuration. The storage device 64 may include a storage area network (SAN) and/or a network attached storage (NAS) system.

In some embodiments, the processor 56 is operatively coupled to the storage device 64 via a storage interface 62. The storage interface 62 is any component capable of providing the processor 56 with access to the storage device 64. The storage interface 62 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 56 with access to the storage device 64.

The memory area 58 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the host station 18 is implemented as a software application. In such embodiments, the hardware described above, such as the processor 56, the memory area 58, the communication interface 60, and/or the storage interface 62 may be shared with the hardware components of a cloud based system (not shown), the HMD 24, and/or a custom helmet that has the HMD 24 embedded therein.

Head-Mount Display (HMD)

Figure 9:
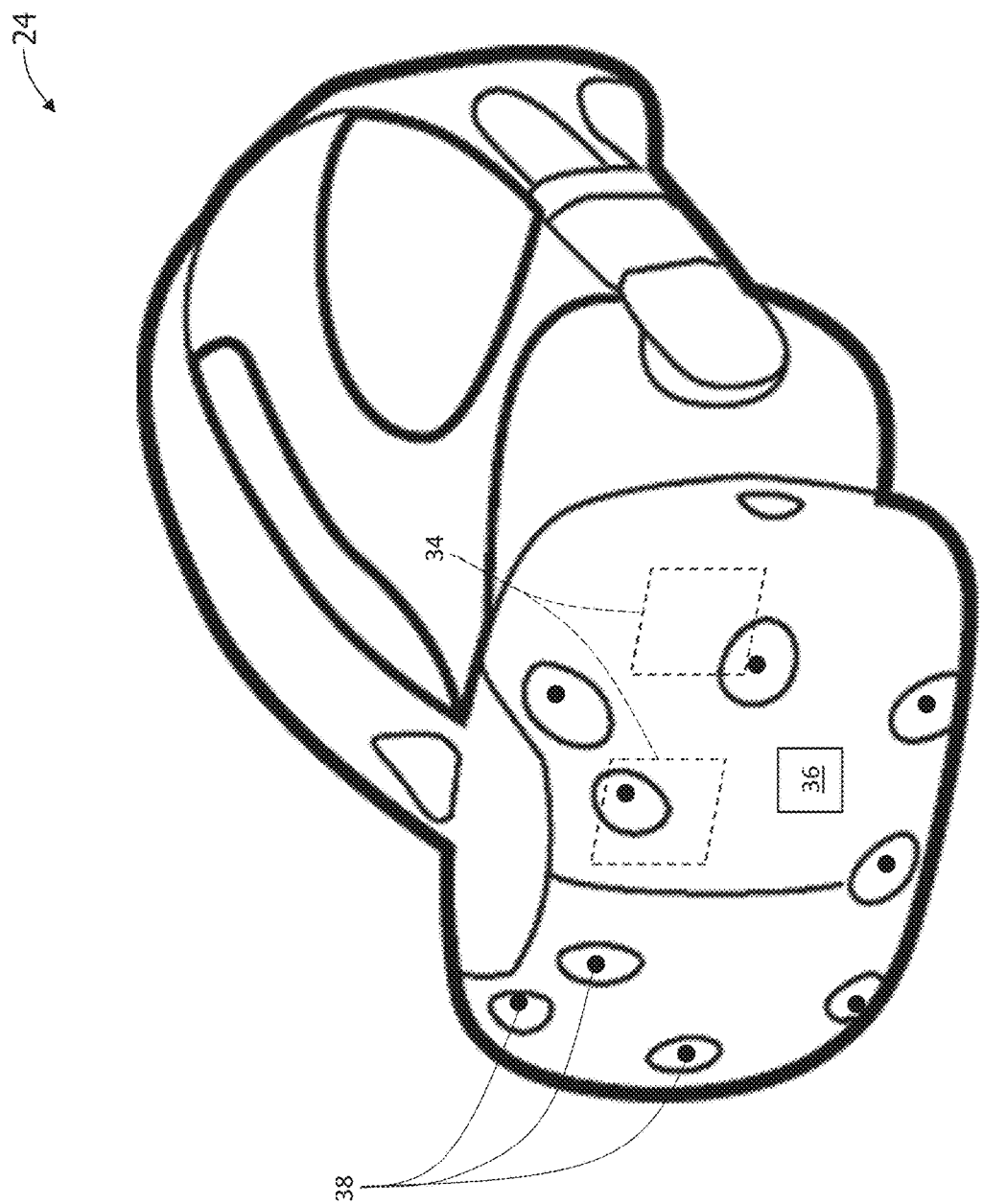
FIG. 9 is an example configuration of a head-mount display shown in FIG. 1, in accordance with one aspect of the present invention.

FIG. 9 is an example configuration of the HMD 24, in accordance with one aspect of the present invention. As described above with respect to FIG. 1, in the exemplary embodiment, the HMD 24 includes an HMD display 34 (e.g., two (2) displays that function as single display from a user's perspective during use), an HMD processor 36, and a plurality of HMD sensors 38. The HMD sensors 38 are coupled in communication to the HMD processor 36, for example, via one or more electrical wires (not shown). In an example embodiment, the HMD sensors 38 are mounted to a front portion of the HMD 24, thereby facilitating tracking or locating the location and orientation of the HMD 24 using the tracking system 12. In some embodiments, the HMD 24 may include gaze-tracking technology to identify where a user is actually looking. For example, the gaze-tracking technology may be operable to identify a specific portion of the display 34 to which the user is looking. As described further herein, the XR system 10 may render objects, targets, virtual players, etc. on the display 34. The HMD 24 may track the gaze of the user as he or she looks at the different render objects, targets, virtual players, etc. to facilitate a training or virtual game session. For example, in certain embodiments of the present invention, the HMD 24 may include one or more cameras (e.g., IR cameras) operable for binocular eye tracking of the user.

Exemplary Computer-Implemented Methods and Use Scenarios

Figure 10:
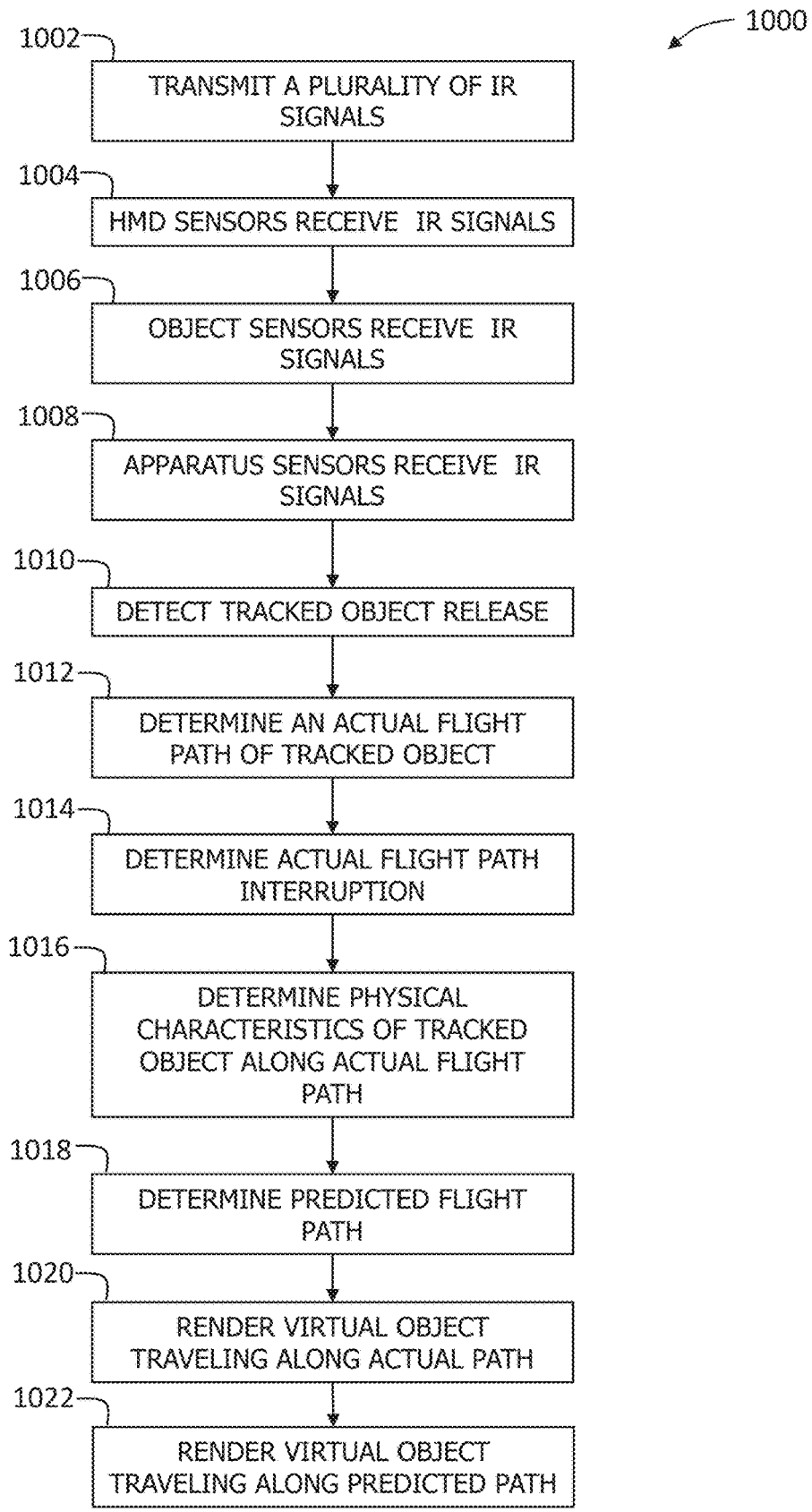
FIG. 10 is a flowchart illustrating an exemplary computer-implemented method for providing a virtual experience to a user interacting with a physical object to replicate a real-life sporting event, in accordance with one embodiment of the present disclosure.

FIG. 10 is a flowchart illustrating an exemplary computer-implemented method 1000 for providing a virtual experience to a user interacting with a physical object to replicate a real-life sporting event, in accordance with one embodiment of the present disclosure. The operations described herein may be performed in the order shown in FIG. 10 or may be performed in a different order. Furthermore, some operations may be performed concurrently as opposed to sequentially. In addition, some operations may be optional.

The computer-implemented method 1000 is described below, for ease of reference, as being executed by exemplary devices and components introduced with the embodiments illustrated in FIGS. 1-9. In one embodiment, the method 1000 may be implemented by the XR system 10 (shown in FIG. 1). While operations within the method 1000 are described below regarding the XR system 10, the method 1000 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In operation, the XR system 10 is configured to sense the football 14 as it is thrown by a user (which may or may not be thrown into the object capture system (or net) 16). The XR system 10 is configured to simulate ball flight relative to one or more simulated targets, which is displayed to the user via the HMD 24. The XR system 10 permits the user to throw the football 14 into the net 16 and the system predicts a flight path that would have been produced without interference by the net.

At operation 1002, the XR system transmits a plurality of IR signals, such as signals 204, 206, 208, and 210 (each shown in FIG. 2) across the user definable 202 (shown in FIG. 2). More particularly, the sensor stations 20 and 22 transmits (or broadcast) a plurality of synchronous signals 204 and 206, respectively, and a plurality of laser signals 208 and 210, respectively, across the user definable 202 via t the TXs 26, 28, 30, and 32 (each shown in FIG. 1). In an example embodiment, the IR signals are transmitted at a frequency in the range between and including about fifty-five (55) times per second (Hz) and about one hundred and five (105) Hz. In a preferred embodiment, the IR signals are transmitted at a frequency of about one hundred (100) times per second (e.g., 100 Hz). It is contemplated, however, that any frequency may be used that enables the XR system 100 to function as described herein.

Prior to an object tracking event (also referred to herein as a football throwing event) during which the user throws the ball, the sensors (e.g., the HMD sensors 38, the object sensors 42, and/or the apparatus sensors 50) of the XR system 10 are configured to sense the IR signals, and thereby a location of the football 14, the net 16, and the HMD 24. Furthermore, the host station 18 is operable to receive location data associated with the sensed location of football 14, the net 16, and/or the HMD 24.

In particular, at operation 1004, a plurality of the HMD sensors 38 receive or sense the synchronous signals 204 and 206 and the laser signals 208 and 210. Each HMD sensor 38 transmits one or more reception signals to the HMD processor 36 as the IR signals are received. The HMD processor 36 uses the reception signals received from the HMD sensors 38 to calculate a location and orientation of the HMD 24 within the user definable 202. The HMD processor 36 transmits the location and orientation of the HMD 24 to the host station 18. It is appreciated that the location and orientation calculations are performed at a high frequency in order to provide a continuous location and orientation of the HMD 24. For example, in a preferred embodiment, the IR signals are transmitted and received at a frequency of about one hundred times per second (e.g., 100 Hz). Consequently, the location and orientation calculations are performed and transmitted at substantially the same frequency. It is contemplated, however, that any frequency may be used that enables the XR system 100 to function as described herein.

In certain embodiments, the HMD 24 may include gaze tracking technology. The HMD 24 may monitor a gaze direction of the user to determine the direction the user is looking in the VR environment displayed on the HMD display 34. The gaze direction may be determined and transmitted to the host station at substantially the same frequency as the location and orientation data.

At operation 1006, a plurality of the object sensors 42 receive or sense the synchronous signals 204 and 206 and the laser signals 208 and 210. Each object sensor 42 transmits one or more reception signals to the object processor 44 as the IR signals are received. The object processor 44 uses the reception signals received from the object sensors 42 to calculate a location and orientation of the football 14 within the user definable 202. The object processor 44 transmits the location and orientation of the football 14 to the host station 18 at substantially the same frequency described above (i.e., 100 Hz).

At operation 1008, a plurality of the apparatus sensors 50 receive or sense the synchronous signals 204 and 206 and the laser signals 208 and 210. Each apparatus sensor 50 transmits one or more reception signals to the apparatus processor 52 as the IR signals are received. The apparatus processor 52 uses the reception signals received from the apparatus sensors 42 to calculate a location and orientation of the frame 54 within the user definable 202. The apparatus processor 52 transmits the location and orientation of the frame 54 to the host station 18 at substantially the same frequency described above (i.e., 100 Hz).

It is appreciated that the operations 1004, 1006, and 1008 are performed continuously during the method 1000. In addition, the operations 1004, 1006, and 1008 are performed substantially at the same time in order to provide continuous and accurate location and orientation data the to host station 18. That is, each of the HMD processor 36, the object processor 44, and the apparatus processor 52 performs its location calculations and transmits the respective location data to the host station 18 continuously, independently, and substantially at the same time as the other respective processors.

At operation 1010, during a ball throwing event in which the user throws the football 14, the host station 18 detects that the football 14 has been released by the user as a result of the throw (referred to herein as "ball release" or "tracked object release"). Detection of ball release may be determined by various ones of the system sensors and/or various detection techniques, as explained in the accompanying disclosure below. For instance, in one example embodiment, ball release may be detected by determining a position of the football 14 relative to the net 16, the HMD 24, and/or another tracked object in the user-definable area 202. The position of the football 14 may be compared to a preset position associated with ball release. Ball release may also be detected based upon a comparison of sensed ball movement (such as ball angular velocity) with a preset movement limit or threshold.

In order to accurately predict a flight path of the football 14, the XR system 10 needs to determine when the football 14 is released by the user during the ball throwing event. Accordingly, the only external influences on the football 14 should be from natural forces (e.g., gravity, air resistance, atmospheric pressure, etc.) to generate an accurate prediction. For at least this reason, ball release detection must be determined. Furthermore, determination of the actual flight path of the football 14 is identified before the football 14 experiences additional external forces, such as contacting the net 16 and/or other objects. The host station 18 is configured to determine a predicted flight path of the football 14 after release (e.g., after all external forces are applied by the thrower), and before the football 14 has contacted the net 16 or other external objects, using a projectile motion algorithm (i.e., projectile motion physics calculations) based on design parameters and based on sensed physical characteristics of the football 14.

Figure 11:
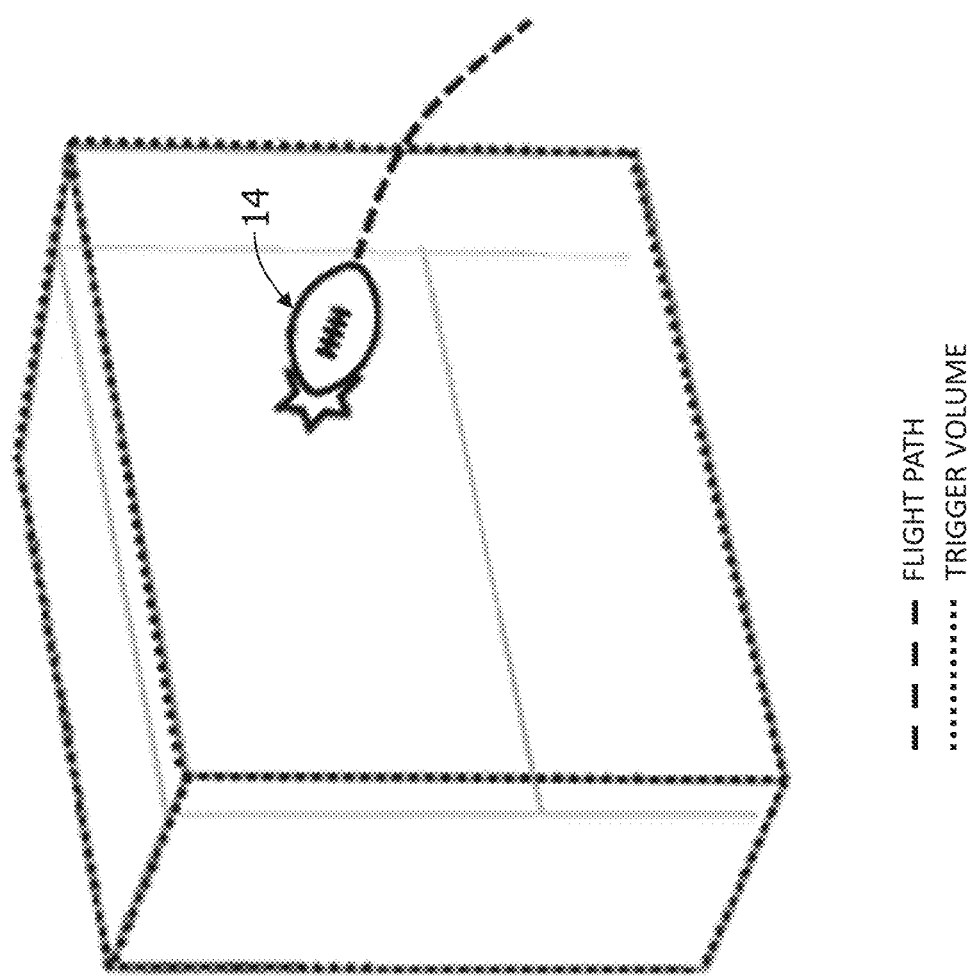
FIG. 11 is a schematic diagram depicting a trigger volume concept for determining a ball release point.

FIG. 11 is a schematic diagram depicting a trigger volume concept for determining ball release. In the example embodiment, a trigger volume is defined within the user-definable area 202 (shown in FIG. 2), for example, by a user by inputting data associated with a defined trigger volume on the host station 18. The trigger volume is used by the host station 18 (shown in FIG. 1) to trigger the prediction calculations. The trigger volume can be dynamic and/or attached to any tracked object within the user-definable area 202, such as the net 16 (shown in FIG. 1). When the location data of the football 14 indicates that the football 14 has crossed into the trigger volume, the host station 18 uses the continuously updated location data of the football 14 within the trigger volume to determine the actual flight path of the football 14, which is then used to determine or calculate the predicted flight path.

Figure 12:
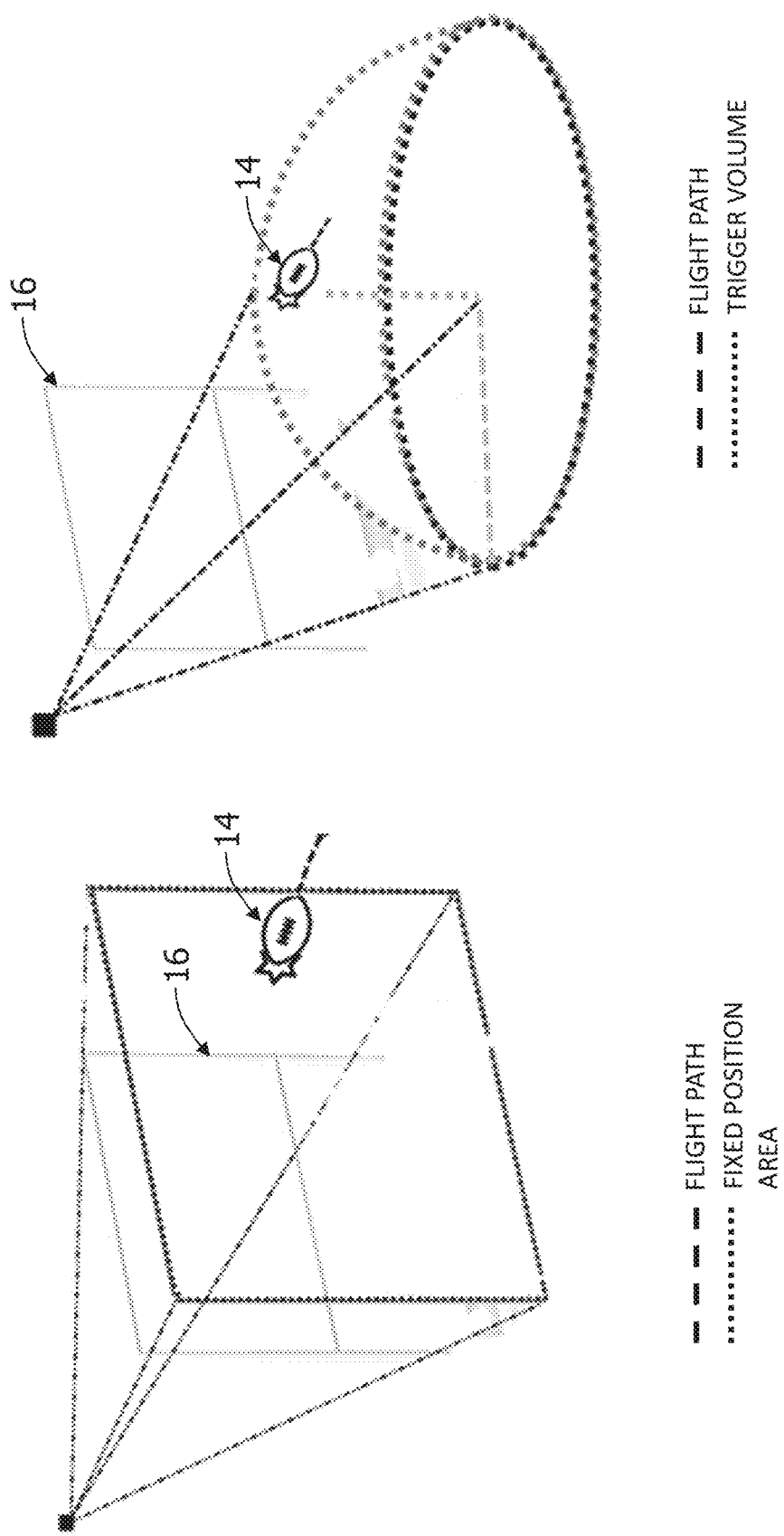
FIG. 12 is a schematic diagram depicting fixed position concepts for determining the ball release point.

FIG. 12 is a schematic diagram depicting fixed position concepts for determining ball release. In the example embodiments, when the football 14 crosses a defined position (e.g., trigger volume, fixed position area, etc.) from known points in space, the host station 18 (shown in FIG. 1) uses the location data of the football 14 to determine the actual flight path of the football 14, which is then used to determine or calculate the predicted flight path. The fixed positions can be different shapes that can be derived by predefined points provided or mathematically derived.

Figure 13:
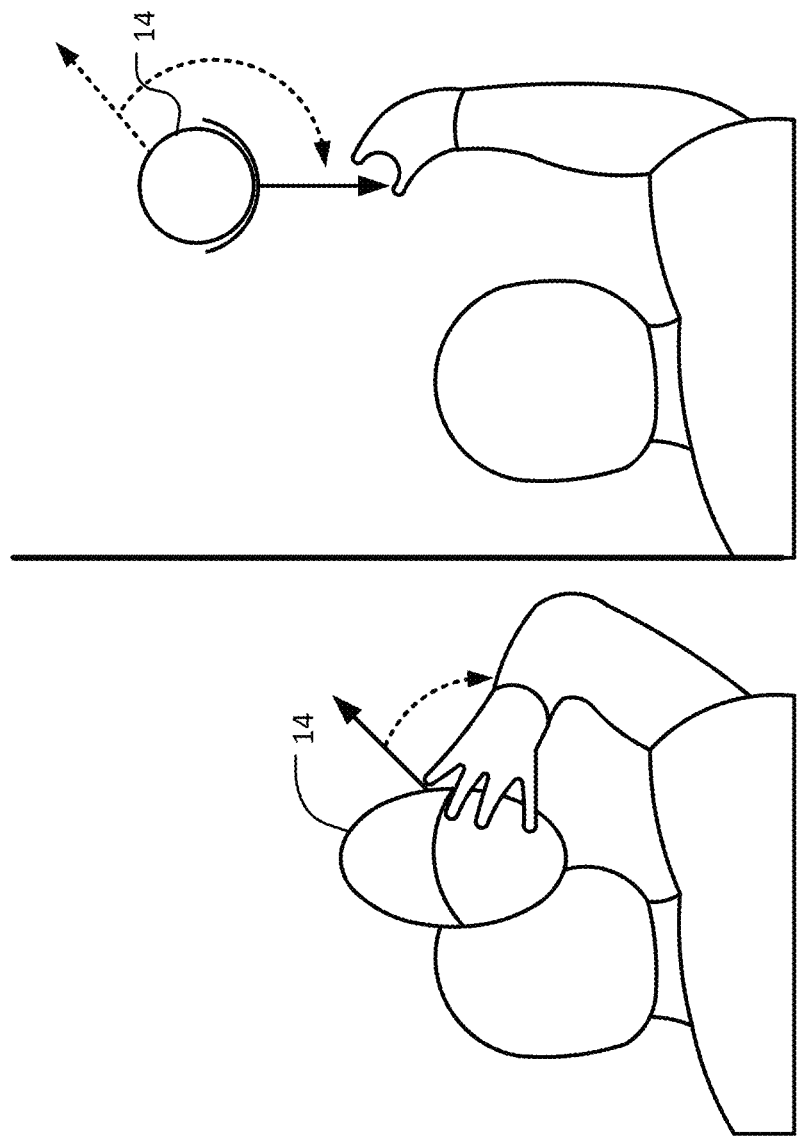
FIG. 13 is a schematic diagram depicting an angular rotation threshold concept for determining the ball release point.

FIG. 13 is a schematic diagram depicting an angular rotation threshold concept for determining ball release. In this embodiment, ball release can be confirmed based on an angular rotation of the football 14 along a longitudinal axis of the football 14 at the time of release. For example, after a predefined amount of angular rotation (i.e., a predefined angular rotation threshold) of the football 14 from a detected starting point, ball release can be determined. This angular rotation threshold can be either be a set amount or a customized amount for each user.

Figure 14:
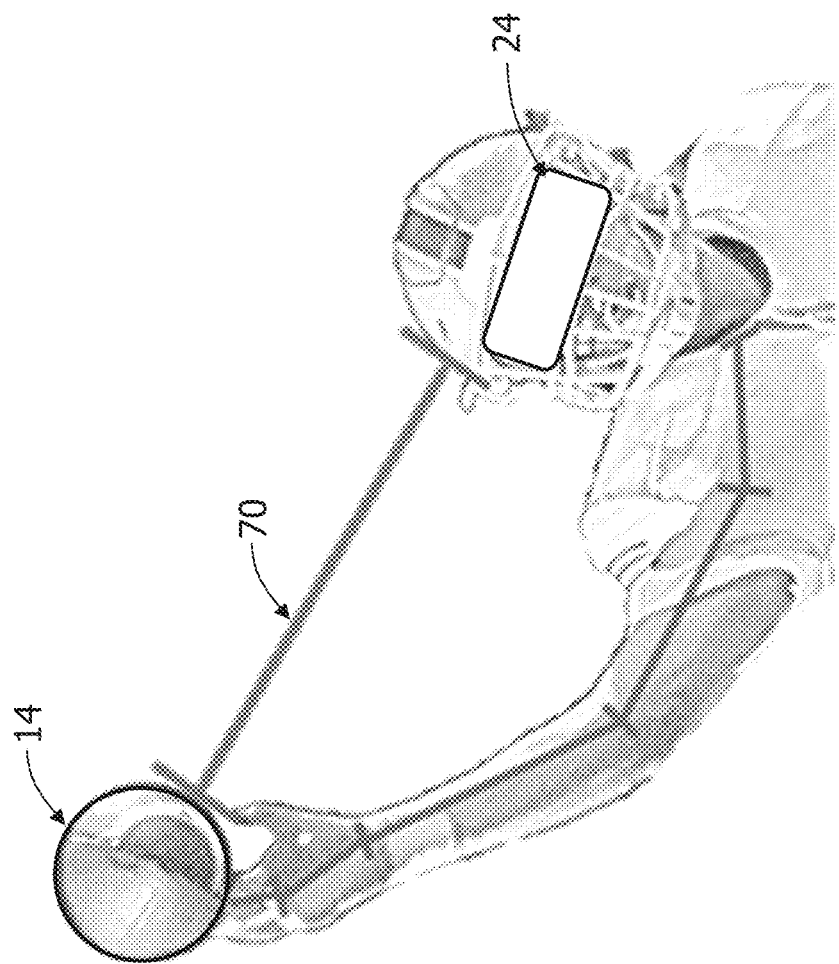
FIG. 14 is a schematic diagram depicting a distance from the head-mounted display concept for determining the ball release point.

FIG. 14 is a schematic diagram depicting a distance from the HMD 24 concept for determining ball release. In this embodiment, after the football 14 has exceeded a predetermined distance 70 from the HMD 24, ball release can be determined to have occurred. The predefined distance 70 can either be generalized or dependent on arm length of the user.

In another embodiment of the XR system 10, ball release may be determined by calculation alone. For example, in such an embodiment, by accounting for an effect of forward momentum of the football 14, measuring the external forces acting on the football 14 and comparing them against the expected measurement of a football only affected by gravity, ball release can be determined.

Referring back to FIG. 10, after determining ball release, at operation 1012, the XR system 10 determines an actual flight path of the football 14. For example, the XR system 10 is configured to sense ball movement and determine sensed movement parameters (e.g., ball position and/or velocity) along a sensed ball flight path. The sensed ball flight path is preferably associated with ball movement after ball release occurs for the ball throwing event. For at least some aspects of the present disclosure, the sensed ball flight path is preferably associated with ball movement prior to occurrence of ball flight interruption for the ball throwing event.

At operation 1014, the host system 18 detects that the ball flight or actual trajectory has been interrupted, completed, or otherwise stopped (referred to herein as "ball flight interruption" or "tracked object flight interruption"). For example, the host station 18 detects if the football 14 has contacted an external object, such as the net 16, a wall, or exited the user-definable area 202. As described above with respect detection of ball release, detection of ball flight interruption may be determined by various system sensors and techniques, as explained in the accompanying disclosure below. Similar to ball release, ball flight interruption may be detected by determining a position of the football 14 relative to the net 16, the HMD 24, and/or another tracked object in the user-definable area 202. The position of the football 14 may be compared to a preset position associated with ball release. Ball flight interruption may also be detected based upon a comparison of sensed ball movement (such as ball angular velocity) with a preset movement limit or threshold.

At operation 1016, the host system 18 determines physical characteristics of the football 14 associated with the actual flight path of the football 14. In particular, the host system 18 analyzes the location and orientation data of the football 14 based on the location and orientation data that occurs between the location data associated with the ball release and the ball flight interruption. Based on the location and orientation data received from the object processor 44, the host station 18 can determine (or calculate) one or more of the following physical characteristics of the football 14 during the ball throwing event: a launch position, a launch angle, a linear velocity, an angular velocity (or spin rate), gyroscopic precession, and gyroscopic drift (or "yaw of repose").

The launch position includes, for example, the angle of the longitudinal axis of the football 14 relative to a ground surface or horizontal plane. This is determined at the ball release point. The launch angle is determined after ball release and is calculated over a predetermined period. This is important because the launch position (i.e., the angle of the football 14 at release) may be different than launch angle (the angle of the flight path relative to the ground surface or horizontal plane). The linear velocity is determined after ball release and is calculated over a predetermined period, for example, by determining a distance traveled over the predetermined period. The angular velocity or spin rate increase gyroscopic stability, which enables the football 14 to keep its symmetric (longitudinal) axis aligned with its actual flight path or trajectory. A typical spin rate for a football is about ten (10) revolutions per second (10 RPS) or about six hundred 600 revolutions per minute (600 RPM). The gyroscopic precession is a secondary spin of the football 14. In particular, the football 14 "wobbles" along its longitudinal axis. It is gyroscopic precession that gives a football the appearance of "wobbling" during flight. When this wobbling dampens, the football 14 assumes yaw of repose or gyroscopic drift. The football's longitudinal axis no longer follows the flight path or trajectory and is pointed off the flight path.

At operation 1018, the host station 18 determines or calculates a predicted flight path or trajectory that generally follows at least part of the actual flight path of the football 14. For example, the host system 18 produces a ball flight prediction based in part on the physical characteristics of the football 14 during the ball throwing event (as described above with regard to operation 1016) and one or more determined environmental characteristics. For example, to provide a realistic predicted flight path, the host station 18 may additionally use one or more of the following characteristics in combination with the physical characteristics described above: air resistance or drag, Magnus effect, atmospheric pressure, humidity, wind speed and direction, weather conditions (e.g., rain, snow, etc.), temperature, and the like.

At operation 1020, the host station 18, based on the physical characteristics of the football 14, simulates (or renders) a virtual football passing along the rendered actual flight path in the VR environment, for example, via data signal 218. That is, the host station 18 transmits a virtual simulation or rendering of a football (which corresponds to the football 14) on the rendered actual flight path of the football 14 to the HMD display 34, or other display (not shown), to be viewed by the user.

At operation 1022, the host station 18 displays or renders the predicted flight path of the football 14 substantially seamlessly and in real time for display on the HMD display 34. More particularly, the host station 18 presents a rendered simulation of a football, in the VR environment, which includes substantially the same physical characteristics and flight path of the thrown ball. The host station 18 then presents or renders the simulated football following the predicted flight path, such that the user is presented with a virtual ball throwing experience that is substantially similar to an actual throwing experience in an open space where the flight path of the ball is uninterrupted.

Optionally, as part of the VR environment, the host station 18 can present a VR training environment to the user vis the HMD display 34. For example, the host station 18 may simulate and display one or more targets, obstacles, virtual players, playing fields, and/or other features in the VR environment in relation to the football 14 following the predicted flight path. The simulated targets may include, for example, stationary targets (e.g., displayed as indicia and/or structure in the simulated environment) and/or moving targets (e.g., a person or other moving target structure displayed in the simulated environment). The VR training environment and virtual targets facilitate enabling the user to train and test their throwing skills by aiming at targets. While the example embodiment is directed to a VR training environment, it is contemplated that the target configurations can also be designed and arranged to accommodate various use cases, including for example, entertainment, consumer, and eSports.

In a preferred embodiment, the XR system 10, and more particularly, the host station 18, is configured to present to the HMD display 34 a simulated sporting event (e.g., a specific play or scenario) that incorporate multiple simulated players. The simulated play may be generated at least partly based upon external data received from one or more external data sources. The external data may be associated with an actual sporting event or other non-simulated game (e.g., pay data from a professional American football game). Furthermore, a simulated play may be generated entirely by the host station 18, for example, using artificial intelligence (AI) techniques. The AI component may analyze historical data related to various object tracking or ball throwing events to provide scenarios to train the user(s), without departing from the scope of the disclosure. For example, in one example embodiment, the VR environment may be rendered using Unreal Engine®, which includes AI features allowing virtual players to following the predicted flight path and react thereto. (Unreal Engine is a registered trademark of Epic Games, Inc., 620 Crossroads Boulevard, Cary NC.)

For example, and without limitation, in one embodiment, the host station 18 may retrieve data associated with a Super Bowl. The Super Bowl data may include one or more plays that include data associated with body movements, position, and orientation of each player. The play may be rendered one the HMD 24 and the user may attempt to replicate a throwing event associated with the play. The predicted flight path of the football 14 would render with the play and presented to the user in real time.

The one or more eternal data sources described above include, for example, data available from Next Gen Stats® (Next Gen Stats is a registered trademark of NFL Properties LLC, 345 Park Avenue, New York NY), Pro Football Focus® (Pro Football Focus is a registered trademark of PFFA Acquisition, LLC DBA Pro Football Focus, 212 E. 14th St., Cincinnati OH), Catapult® (Catapult is a registered trademark of Catapult Group International Ltd., 75 High Street Prahran, VIC AUSTRALIA), wearable tracking technologies, computer vision data, and the like.

In one example embodiment, the host station 18 is configured to measure field of view of the user (e.g., based on orientation of the HMD 24), eye tracking (e.g., via gaze-tracking technology of the HMD 24), head positioning tracking (e.g., based on orientation of the HMD 24), ball tracking, and generate predicted ball trajectories. These data may be used to facilitate training the user, for example, to better perform in real-world sporting scenarios. The XR system 10 can generate a report including one or more of the following metrics: throwing accuracy, release time, spiral efficiency, spin rate, ball velocity, ball angle, time of flight, throwing motion, and follow through. In addition, in embodiments including gaze-tracking technology, the XR system can report a user's eye movements during a simulated training play.

The XR system 10 may record and store data associated with each object tracking event in a database, stored for example, on the storage device 64. The data may be associated with a registered user and/or a specific sport. Furthermore, the data may be analyzed using AI and/or machine learning technology to generate one or more performance scores. The score is based on the metrics obtained from the analytics to assess a user's performance. Users can adapt the score to match their pre-defined criteria.

In one embodiment, user metrics may be tracked and stored for practices and individual routine learning. For example, when a user begins a training session, the user may know what aspects of their performance to concentrate and work on to increase their individual performance.

It will be apparent to one skilled in the art that the sport of American football, as disclosed herein with respect to the XR system 10, has been provided only for illustration purposes. It will be understood that one or more embodiments may provide training systems and methods for other sports including, but not limited to, soccer, baseball, hockey, basketball, rugby, cricket, and handball, for example. Furthermore, it is appreciated that the techniques described herein may be employed in social media and multi-player environments.

As used herein and as is commonly known in the art, a "play" is a plan or action for one or more players to advance the team in the sporting event. Embodiments described herein may employ head-mounted displays (HMDs) or immersive systems as specific examples of extended reality environments. It will be appreciated that other embodiments may employ HMDs, immersive systems, mobile devices, projection systems, and/or any other forms of simulated environment displays.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. A system comprising:
a tracking system comprising a host station and a sensor station,
said sensor station including a first transmitter transmitting a first signal, and a second transmitter transmitting a second signal, wherein the first signal and the second signal are broadcast across a user-definable area;
a display displaying a virtual reality (VR) environment; and
a tracked object including a plurality of object sensors sensing the first signal and the second signal,
said tracked object determining an object location and an object orientation of the tracked object relative to the sensor station based on the first signal and the second signal, said tracked object transmitting the object location and the object orientation to the host station, said host station comprising a processor coupled in communication to the tracked object and the display, said processor programmed to:

determine an actual flight path of the tracked object during an object tracking event where the tracked object is moving relative to the sensor station, the actual flight path based on the object location and the object orientation of the tracked object;

generate a predicted flight path of the tracked object based on the object location and the object orientation of the tracked object; and render an image of a virtual object on the display in the VR environment, wherein the image includes an image of a virtual object corresponding to the tracked object, wherein the image of the virtual object is rendered in the VR environment such that the image of the virtual object moves along the actual flight path rendered in the VR environment on the display and the predicted flight path rendered in the VR environment on the display.

2. The system in accordance with claim 1, wherein the sensor station transmits the first signal and the second signal at a frequency in a range between and including about fifty-five (55) times per second (Hz) and about one hundred and five times per second (105 Hz).

3. The system in accordance with claim 2, wherein the sensor station transmits the first signal and the second signal at a frequency of about one hundred times per second (100 Hz).

4. The system in accordance with claim 1, further comprising an object capture system including a plurality of apparatus sensors sensing the first signal and the second signal, said object capture system determining a frame location and a frame orientation of the object capture system relative to the sensor station based on the first signal and the second signal, said object capture system transmitting the frame location and the frame orientation to the host station.

5. The system in accordance with claim 1, said processor further programmed to detect a tracked object release, wherein external influences on the tracked object are only from natural forces.

6. The system in accordance with claim 5, wherein the tracked object transmits the object location and the object orientation of the tracked object to the host station at a frequency in a range between and including about fifty-five (55) times per second (Hz) and about one hundred and five times per second (105 Hz).

7. The system in accordance with claim 6,
said operation to detect the tracked object release comprises said processor programmed to:
receive data defining a trigger volume located in the user-definable area; and
detect when the location of the tracked object has entered the trigger volume.

8. The system in accordance with claim 7,
said operation to determine an actual flight path of the tracked object comprises said processor programmed to determine the actual flight path of the tracked object based on continuously updated location data associated with the tracked object within the trigger volume.

9. The system in accordance with claim 6,
said operation to detect the tracked object release comprises said processor programmed to determine an angular rotation of the tracked object based on a predefined angular rotation threshold.

10. The system in accordance with claim 6,
said processor further programmed to detect a tracked object flight interruption, wherein a trajectory of the tracked object is one or more of the following: interrupted, completed, and stopped.

11. The system in accordance with claim 10,
said operation to determine an actual flight path of the tracked object comprises said processor programmed to determine the actual flight path of the tracked object based on the object location and the object orientation when the tracked object is between the tracked object release and the tracked object flight interruption.

12. The system in accordance with claim 1,
said display comprising a head-mounted display including a plurality of HMD sensors sensing the first signal and the second signal,
said head-mounted display determining an HMD location and an HMD orientation of the head-mounted display relative to the sensor station based on the first signal and the second signal,
said tracked object transmitting the HMD location and the HMD orientation to the host station,
said processor further programmed to detect a tracked object release, wherein external influences on the tracked object are only from natural forces.

13. The system in accordance with claim 12,
said operation to detect the tracked object release comprises said processor programmed to determine that the object location is greater than a predetermined distance from the HMD location.

14. The system in accordance with claim 13, wherein said processor is programmed to determine one or more of the following: a field of view of a user of the head-mounted display, eye tracking of the user, and head positioning tracking of the user.

15. The system in accordance with claim 1,
said processor further programmed to generate a report including one or more of the following metrics: throwing accuracy, release time, spiral efficiency, spin rate, ball velocity, ball angle, time of flight, throwing motion, and follow through.

16. The system in accordance with claim 1,
said processor further programmed to determine one or more of the following physical characteristics of the tracked object during the object tracking event: a launch position, a launch angle, a linear velocity, an angular velocity, a gyroscopic precession, and a gyroscopic drift.

17. The system in accordance with claim 16, wherein the processor includes a projectile motion algorithm generating the predicted flight path based on design parameters and based on the one or more physical characteristics of the tracked object.

18. The system in accordance with claim 17, wherein the predicted flight path is further based on one or more environmental characteristics.

19. The system in accordance with claim 18,
the one or more environmental characteristics including one or more of the following: air resistance, Magnus effect, atmospheric pressure, humidity, wind speed, wind direction, rain, snow, and temperature.

20. The system in accordance with claim 1, said processor further programmed to generate one or more performance scores based on the predicted flight path of the tracked object.

* * * * *